Figure 5:
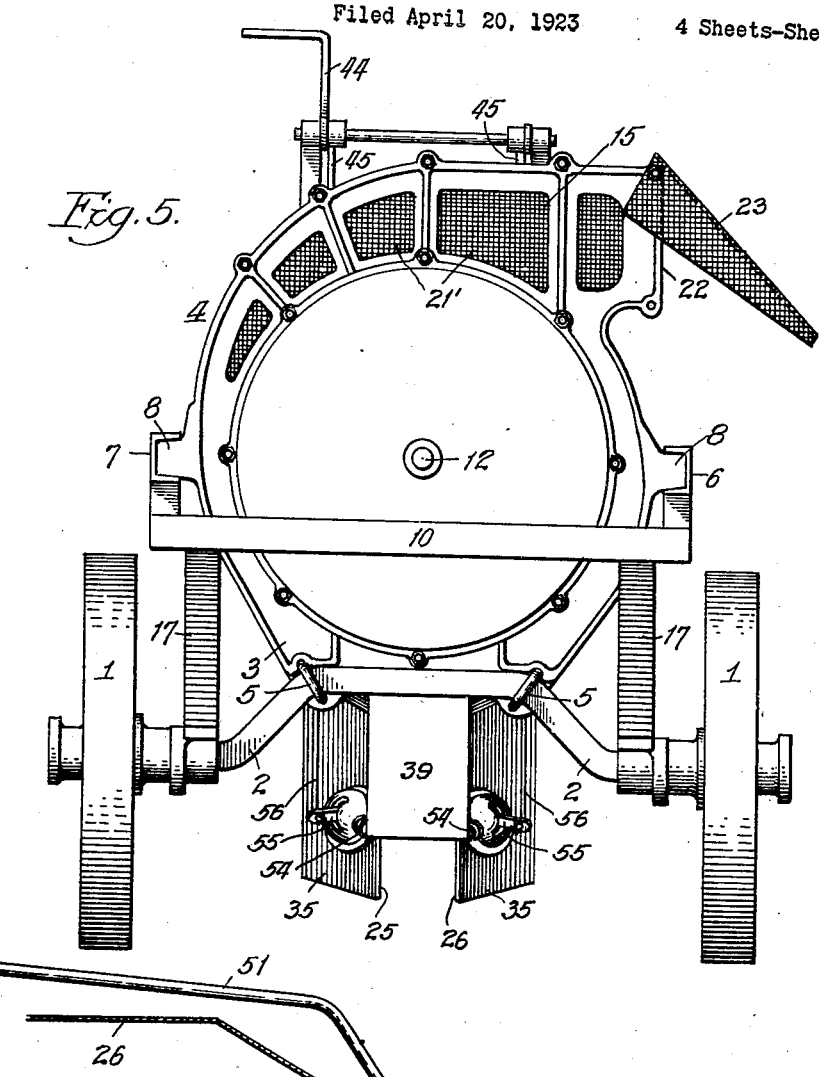

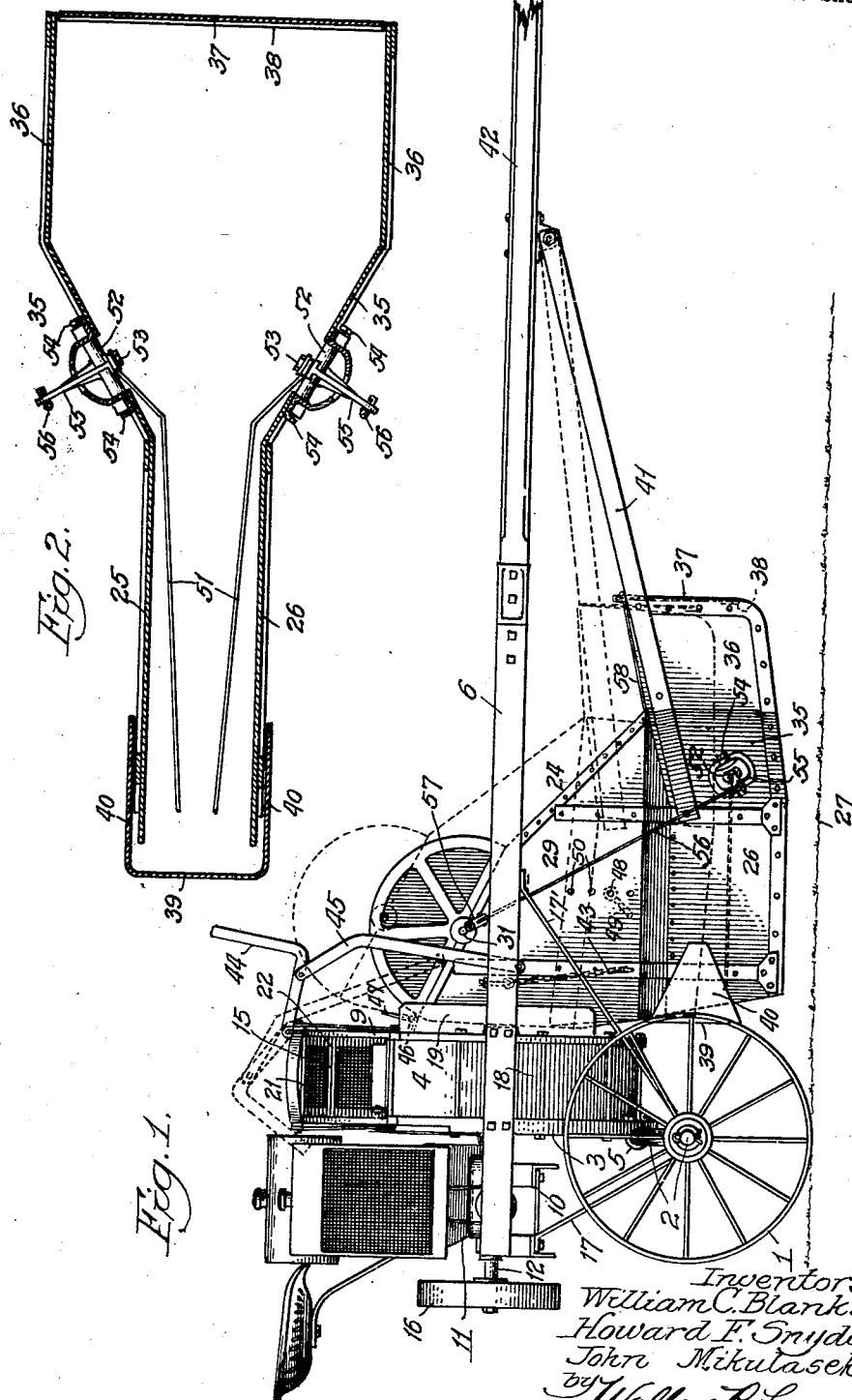

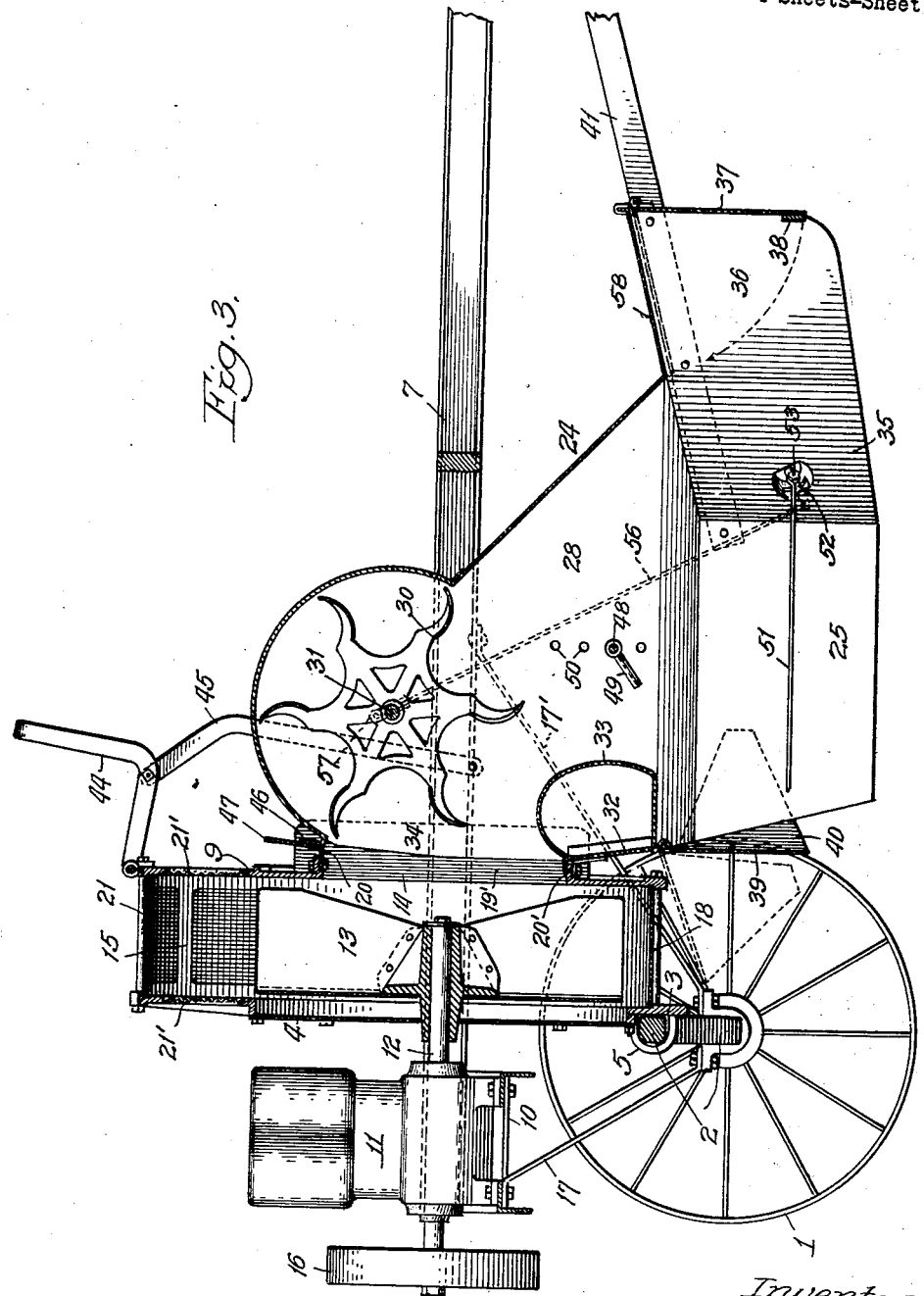

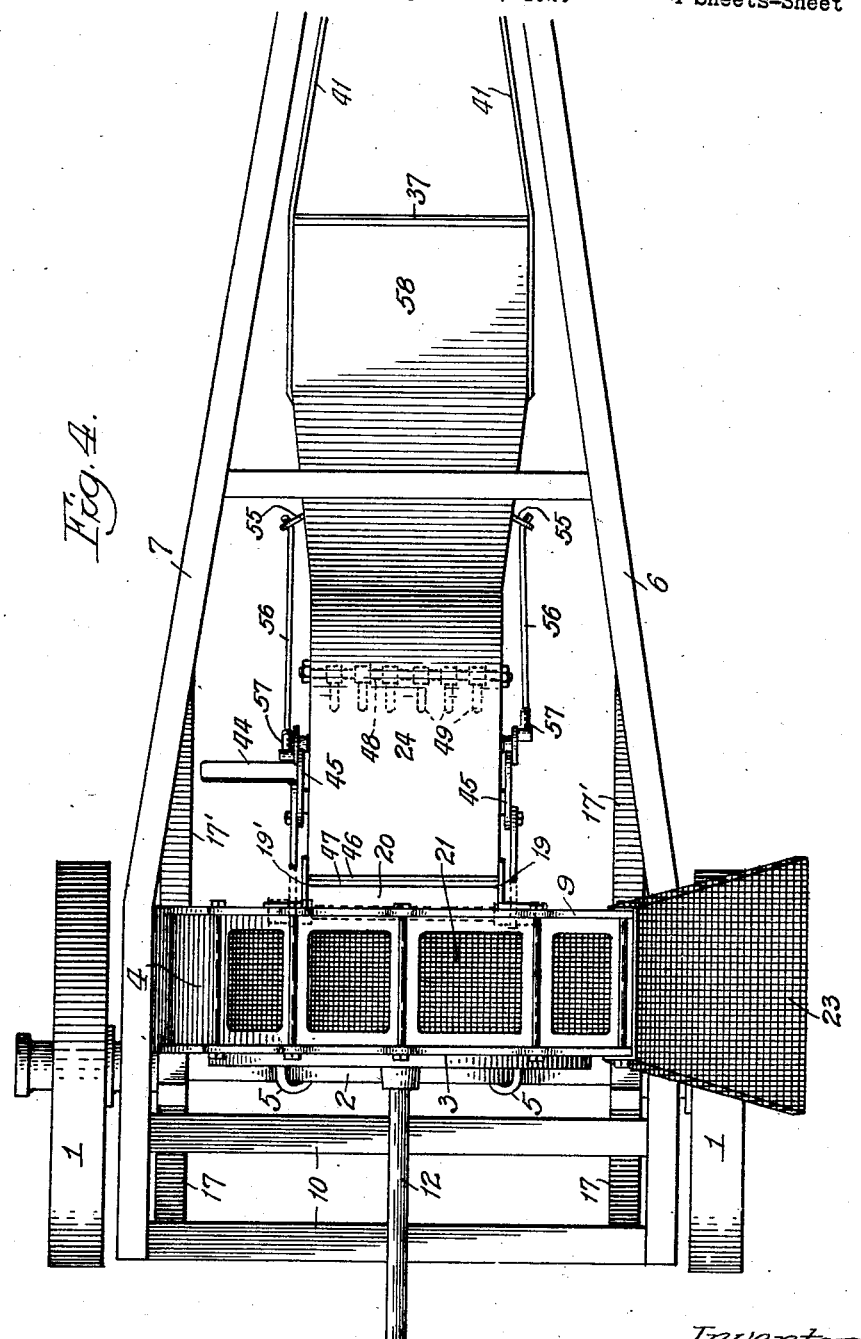

Jan. 3, 1928.

W. C. BLANKS ET AL 1,654,783

INSECT DESTROYING DEVICE

Filed April 20, 1923  4 Sheets-Sheet 4

Inventors:
William C. Blanks,
Howard F. Snyder,
John Mikulasek,
by Wallace R. Lane, Atty.

Patented Jan. 3, 1928.

1,654,783

UNITED STATES PATENT OFFICE.

WILLIAM C. BLANKS, OF AUSTIN, TEXAS, AND HOWARD F. SNYDER AND JOHN MIKULASEK, OF NEWTON, IOWA; SAID SNYDER AND SAID MIKULASEK ASSIGNORS TO THE MAYTAG COMPANY, OF NEWTON, IOWA, A CORPORATION OF MAINE.

INSECT-DESTROYING DEVICE.

Application filed April 20, 1923. Serial No. 633,353.

The present invention relates to devices for destroying insects, parasites, etc. on plants, such as boll weevils, on cotton plants.

Among the objects of the invention is to construct a device which may be moved over the ground and growing plants and capable of removing and destroying insect parasites attached or clinging to the plants in order to save the plants from destruction by the insects; to provide a construction which will substantially enclose the plants during the operation of the destroying device whereby the insects may be completely removed and destroyed and prevented from escaping; to provide the destroyer with a suction means or device, preferably of the fan type and also preferably located on the destroying device transversely of the support or frame thereof and also between the wheels of the destroyer in order that the path of the exhausting air may be as short and direct as possible and also as proximate as possible to the hood; to provide a hood with means such that the hood may be close to the ground so that the rush of air will be through a relatively narrow space or opening between the top surface of the ground and the bottom or lower edges of the hood and in order that there may be no way of escape for the insects; to provide a hood with doors, preferably at the ends of the hood, to permit the easy entry of the plants into the hood as the hood is made to pass over the plants, the doors preferably being weighted, or pendulously hung so that they will automatically close by their inherent weight and confine the plants within the interior of the hood during the exhausting operation therein; to provide the hood with means, such as side wings on a door to prevent the inrush of air into the hood other than the space between the bottom of the hood and the top surface of the ground; to provide means for movably supporting the hood on the destroyer so that the hood may be held in adjusted height with respect to the ground in order to accommodate the proper operation of the device over ground of varying contour, such as when the wheels run in furrows running along the sides of a row or line of hills containing the plants, or the plants of different heights, the hood being raised or lowered, respectively, for tall or short plants, when it is desired to effectively operate on the heads or buds of the plants; to provide a device with means for lifting and holding in lifted position, the hood clear from the ground, obstructions on the ground, and plants, when the destroyer is being transported from one place of operation to another; to provide, preferably, a hinged or pivotal connection between the hood and the supporting frame of the destroyer, whereby the hood may swing upwardly and downwardly about such connection, the hood being preferably rigidly secured to draw bars extending toward the forward end of the supporting frame where the bars may be pivotally connected thereto; to provide the suction device with, preferably, bolts for rigidly connecting it to the axle of the destroyer, and also preferably rigidly connecting the supporting frame to the suction device whereby the suction device is made a rigid part of the support, thus eliminating the necessity of extra frame work or structure and considerably simplifying the device in general; to provide an adjustable, preferably a slidable, connection between the inlet of the suction device or fan and the outlet of the hood, whereby the adjustment of height of the hood will not destroy the connection between the fan and the hood; to provide the fan and hood, preferably at the connection therebetween, with means such as cooperating sliding members or flanges, to maintain the connection substantially sealed at all times and at all relative positions of the fan and head, against inrush of air into the hood or fan, thus maintaining the efficiency of the exhausting action of the fan and in the hood; to provide such adjustable connections, preferably, with curved or arc shaped cooperating slidable members which are formed upon an arc generated about the axis of the hinge or pivotal connection between the hood draw bars and the forward end of the frame; to provide the hood with baffle bars located in the hood, preferably having means for adjustably locating the bars at different heights in order that they may hit against the heads of the plants of different heights for the purpose of dislodging the insects clinging to the plants; to provide, within the hood, agitators capable of striking against the plants as the hood passes over them, to shake the whole plant or the branches thereof, also to dislodge the insects therefrom, the agitators being preferably continually operated by means carried by the hood and including a wind mill located within the hood in the path of flow of air from the interior of the hood to the fan, thus necessitating no additional operating or driving mechanism from the source of power, which, in this case, may be an internal combustion engine having driving connection with the fan only; to provide a fan, preferably at and near the discharge portion thereof, with air escapes or ports for the ready relief of the compressed air and for creating no back pressure upon the fan operating mechanism, the ports being preferably screened to prevent the escape of the insects before they are thoroughly destroyed; to provide the discharge outlet of the fan with a baffle member, preferably in the form of a screen located at an inclined angle opposite the discharge, so that the insects may be hurled against the baffle screen and killed, the stream of air being permitted to easily escape through the baffle; to provide, if desired, means at the discharge end of the fan for attaching a collecting container such as a sack, for catching the insects after they have been hurled against the baffle screen and destroyed, although, if desired, the sack may be dispensed with and the annihilated insects permitted to drop to the ground; and to provide for such other and further objects, advantages and capabilities as will later more fully appear and are inherently possessed by the invention.

Figure 6:
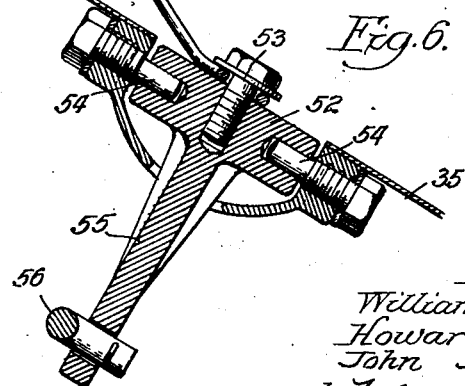

In the drawings illustrating a preferred embodiment of the invention, Fig. 1 is a side view of the destroyer; Fig. 2 is a horizontal sectional view taken through the hood of the destroyer; Fig. 3 is a side view, partly in section, of the destroyer, showing the general construction of the fan, hood, and wind-mill; Fig. 4 is a top plan view of the destroyer; Fig. 5 is a rear end view of the device; and Fig. 6 is a detail, partly in section, of the pivotal means for operating the agitators within the hood.

Referring now more particularly to the drawing, the invention is shown as comprising wheels 1, rotatably carried upon the ends of an axle 2, rigidly bolted to a head 3 of a suction device or fan casing 4, by means of bolts 5. A frame, comprising frame side bars 6 and 7 is secured to the side of the fan casing 4 as by means of projections 8 extending into the channels of the side members 6 and 7 and bolts or screws fastening the side members 6 and 7 to the heads 3 and 9 of the casing device. The side frame members 6 and 7 extend and converge forwardly where they are connected together and provided with suitable means for connection to a tractor or team of horses for drawing the destroying device over the ground. At the rear end of the frame is connected a platform 10 upon which may be mounted a source of power, such as an internal combustion engine 11 having the shaft 12 thereof extending into the suction device and provided at its end with a fan, 13, so located within the suction device as to create a suction through an opening 14 of the fan casing and to discharge the drawn air upwardly into the discharge passage or housing 15, upon the upper portion of the suction device. The other end of the shaft 12 may carry a suitable fly wheel 16. The side members 6 and 7 and the axle 2 may be connected by suitable brace members or rods 17 and 17'.

The suction device comprises a forward head 9 and a rear head 3 with an interposed housing member 18. The heads may be secured to the housing of the suction device in any suitable manner, as by means of bolts. The forward head 9 is provided with an opening or air inlet 14, formed by providing around the opening a pair of vertical flanges 19 and 19' and horizontal flanges 20 and 20' extending within the ends of the vertical flanges 19 and 19' and fitting closely between them. At the upper part of the suction device is formed a discharge member 15 which is preferably formed with top and lateral air escape openings 21 and 21', the openings being preferably provided with screens in order to prevent the escape of the insects, although permitting the ready escape of the air discharged from the fan 13. The discharge member has an opening 22 through which the main stream of air is discharged. Opposite this opening is pivotally supported a baffle screen 23, preferably at an angle, opposite such opening, so that as the stream of air with the insects is discharged against the screen 23, the insects will, by reason of their impact with the screen, be annihilated or killed, and caused to drop downwardly, either to the ground or into a container attached to the end 22, and also permitting the air to readily escape through the screen 23.

It will be noted that the suction device is located transversely of the frame of the destroyer and also between the wheels 1, whereby a compact and simple device is provided. It will also be noted that the frame, the suction device and the axle form together a single, rigid construction, the suction device forming a part of the supporting means of the destroyer.

Forwardly of the suction device and suitably connected to it is a gathering and suction hood 24, having a pair of vertical side walls 25 and 26 extending downwardly with their lower edges proximate to the ground 27, and with upwardly extending wall portions 28 and 29, the latter forming a housing for a vane or wind-mill 30 connected to a transverse shaft 31, rotatably mounted in the side walls of the housing 24. At the rear of the hood is also formed an upwardly extending portion 32 together with a curved or tubular portion 33 acting as a brace member between the side walls of the upper part of the hood and the side wall of the throat of the hood for directing the upward flow of air therebetween and the walls 28 toward the outlet 34 of the hood and the inlet 14 of the suction device. The forward end of the hood has flared portions or walls 35 extending into a widened portion 36, forming the entry mouth of the hood for the plants as the hood is caused to move over the plants or along a row of plants. At the forward end of the hood and between the side walls 36 thereof is pivotally mounted a door 37 preferably provided at its lower end with a weight 38. This door is adapted to open inwardly and to the dotted line position shown in Fig. 3 of the drawing and in direction of the arrow also shown on that figure, when the door comes in contact with plants to permit the plants to enter into the hood, and the door, by reason of its own weight, is capable of pendulously swinging down into vertical or closed position. At the rear end of the hood is also provided a second door 39 which opens away from the end of the hood, and in order to prevent inrush of air laterally into the hood between this door and the rear end of the hood, the door is provided with a pair of wings 40 located closely to the side walls 25 and 26 of the hood so that the side wings will act continually to seal the opening between the door 39 and the rear end of the hood at all times and in all positions of opening of the door so as to prevent such inrush of air.

The hood is suspended from the frame for movement in a substantially vertical direction to and from the ground. To accomplish this the hood is rigidly connected to a pair of draw bars 41, pivotally connected or hinged at their forward ends to the tongue 42 (see Fig. 1) of the insects destroying device. Near the rear end of the hood are connected, at each side of the hood, chains 43, the upper end of the chains being suitably connected in an adjustable manner to the side bars 6 and 7 of the frame. It will thus be seen when it is desired to raise or lower the hood with respect to the ground at any desired height the length of the chain 43 may be varied or connected to the bolts or hooks on the side bars so that the hood will be at the desired or given distance from the ground.

When the hood is not in use and is to be transported together with the remainder of the destroying device from one place of operation to another it is usually desirable to raise the hood out of proximity to the ground so that it may not strike obstructions on the way, plants or the like, and for this reason the device is also provided with a lifting means, comprising a hand lever body 44 pivotally connected to the top of the suction device and connected by a link 45 to the side of the hood, the links 45 being preferably pivotally connected to the hood. It will thus be noted that when the hand lever is operated (see Fig. 1) from the full line position to the dotted line position shown in the figure, the hood and the parts connected thereto may be raised from the full line position to the dotted line position shown therein. In this way it will be seen that the hood is clear of the ground and the destroyer may be transported from one place of operation to another without the hood coming in contact with projections on the ground or with growing plants.

In order that the hood may remain continually connected with the suction device at all times without a break occurring between the outlet of the hood and the inlet of the suction device, both the hood and the suction device are provided with cooperating flange members 46, 47, suitably secured or attached to the hood and the suction device, respectively. These members are shaped in the form of a curve or arc generated about an axis passing through the pivot or hinge connection between the draw bars 41 and the tongue 42. The length of the flanges is such that as the flange 47 is caused to slide over the flange 46 when the hood is raised and lowered there will be continual contact, thus preventing any break between the outlet 34 and the inlet 14 at any adjusted position of the hood relative to the suction device. It will also be seen that the side walls at the outlet 34 of the hood extend in close proximity to the side walls or flanges 19 and 19′ so as to prevent any lateral inrush of air into the passage leading from the hood into the suction device.

It will be noticed that the side walls 25 and 26 of the hood 24 slide between the laterally extending flanges 19′ of the fan casing. In this manner when the hood 24 is raised or lowered the hood will slide upwardly and make a friction fit on its side walls with the flanges 19′. In order to prevent the air from entering the hood at the flange 20′ of the casing when the hood is raised, the hood is provided with an inwardly extending horizontal flange 24′ which is adapted to act upon the horizontal flange 20′ of the casing. In such a construction the hood can raise and lower relatively to the casing of the fan and at the same time will make a substantially air tight joint therewith. The joint between the flanges 20′ and 24′ is merely a sliding frictional disc.

Within the hood, at a relatively elevated position, is located a baffle bar 48 provided with a number of teeth 49. This bar may be adjustably connected or located in place within the hood in any pair of a number of suitable apertures 50 provided in the side walls of the hood. This bar is so located that it comes in contact with the heads of the plants from which the insects are to be shaken as the hood is passed over the plant. If the plants are tall the baffle bars and rake teeth 49 will be located at a higher position, and when the plants are lower the bar may be located at a lower position.

In the lower portion of the hood near the lower opening or mouth thereof, is also located a set of agitators or striker bars 51, which are connected at their forward ends to pivotal members 52, as by means of a screw 53. These pivotal members are mounted upon adjustable pivot pins 54, secured in the flared wall portion 35 of the hood, as clearly shown in Fig. 6 of the drawing. The pivotal member 52 has an outwardly extending arm 55 to the outer end of which is connected a link rod 56, the other end of the rod being connected to a crank 57, secured to the end of the shaft 31 of the wind-mill 30. As the wind-mill is caused to rotate by reason of the stream or flow of air from the interior of the hood towards the suction device, the link 55 is caused to reciprocate and to oscillate the pivotal member 52. This will cause an agitating action or motion of the agitator bars or rods 51 within the hood. These bars strike against the plants, particularly the stalks of the plants, and their branches, and possibly the heads of the plants, if the plants are short. These bars will so shake the plants as to loosen or dislodge the insects so that the upward draft or flow of air through the hood will catch the insects and draw them into the suction device.

It will also be noted that the adjustment of the height of the hood is of utility to bring the lower edge of the hood close to the ground, preferably within one inch of the surface of the ground, so that the only space for access of air into the hood is through the space provided between the top surface of the ground and the lower edges of the hood. This upward draft of air is drawn upwardly around the plants towards the upper part of the hood and into the suction device, the drawn air and insects being impelled by the fan blade 13 toward the discharge outlet 22. If the wheels 1 of the destroyer ride in furrows on each side of a hill of plants, the hood may be adjusted upwardly so as to be still close to the ground as before.

In operation the destroyer is drawn by any suitable means such as a tractor or team of horses, or other method, along rows of plants, preferably cotton plants, with the wheels running on opposite sides of the row; the internal combustion engine is set in operation, the hood adjusted so that its lower edge will be close to the ground, and the end doors in closed position. As the destroyer proceeds toward the plants, the plants will hit against the forward door 37, causing the door to swing upwardly and rearwardly so as to permit the entry of the plants into the lower portion of the hood. In the meanwhile the draft of air being created upwardly through the hood will cause an operation of the wind-mill 30 and an agitation of the agitator bars 51. As the plants pass through the widened portion 36 of the hood, and against the converging sides 35, the plants are crowded toward the narrower portion of the hood between the agitator bars 51. The bars will then hit against the stalks of the plants and cause them to be shaken so as to loosen the insects from the plants, particularly the heads of the plants. If there are any loose buds on the plants that are partly dead, they will also be shaken off and caught in the stream of air flowing upwardly through the hood. As the insects are dislodged from the plants, and attempt to escape, the strong upward draft of air through the hood will catch them and draw them through the impelling flanges 13 of the fan and hurl them outwardly through the discharge 22 against the baffle screen 23, the force of the impact of the insects against the baffle screen 23 being sufficient to destroy or kill them. They may then fall to the ground, or if desired, a suitable container such as a bag, may be connected to the open end 22 and the screen 23 so as to collect the destroyed insects. As the destroyer proceeds the plants will then come in contact with the rear door 39, opening it outwardly toward the rear until the plant releases it and the door again swings into closed position by gravity. The door having side wings will prevent lateral inrush of air between the door and the rear end of the hood. During the passage of a plant within the hood, besides shaking the plant as a whole by the agitator bars, the heads of the plants, as they swing upwardly from contact with an upper wall 58 of the widened portion 36 of the hood, will cause the heads of the plants to strike against the baffle bar 48—49. This strong impact of the heads of the plants against the bar will further dislodge insects that cling with greater tenacity to the head.

While we have herein described and shown upon the drawing a preferred embodiment of the invention, it is to be understood that the invention is not limited to the particular construction, details and arrangements of parts shown and described, but that other constructions, details and arrangements of parts are comprehended by the invention without departing from the spirit thereof.

Having now described our invention, we claim:—

1. An insect destroyer comprising a support movable over the ground and plants, a hood carried by the support and operating to enclose plants during the movement of the support, a suction device connected with the interior of the hood for drawing air and insects therefrom into the suction device, agitators in the hood for vibrating the plants and dislodging insects therefrom, and means operated by the draft of air for operating the agitators.

2. An insect destroyer comprising a support movable over the ground and plants, a hood carried by the support and operating to enclose plants during the movement of the support, a suction device connected with the interior of the hood for drawing air and insects therefrom into the suction device, agitators in the hood for vibrating the plants and dislodging insects therefrom, and means for operating the agitators, said last mentioned means including means operated by the draught of air from the hood to the suction device for operating said agitators.

3. An insect destroyer comprising a support movable over the ground and plants, a hood carried by the support and operating to enclose plants during the movement of the support, a suction device connected with the interior of the hood for drawing air and insects therefrom into the suction device, agitators in the hood for vibrating the plants and dislodging insects therefrom, and means for operating the agitators, said last mentioned means including a wind mill located in the path of flow of air from the hood to the suction device for operating said agitators.

4. An insect destroyer comprising a support movable over the ground and plants, a hood hinged to the support and operable to enclose plants during the moving of the support, means connected to the support and to the hood for holding the hood in raised or lowered position with regard to the support and the ground, a suction device on the support, means adjustably connecting the hood to the suction device, said connecting means having cooperating relatively slidable members whereby the connection between the hood an the suction device is maintained substantially sealed, said members being curved on an arc generated about the axis of the hinge connection between the hood and the support.

5. An insect destroying device comprising a support movable over the ground and plants, a hood hinged to the support and operable to enclose plants during the moving of the support, means connected to the support and to the hood for holding the hood in raised or lowered position with regard to the support and the ground, agitators in the hood for vibrating the plant and dislodging insects therefrom, and a suction device on the support, means adjustably connecting the hood to the suction device, said connecting means having cooperating relatively slidable members whereby the connection between the hood and the suction device is maintained substantially sealed.

6. In an insect destroying device comprising a support movable over the ground and plants and means for creating a suction, a hood carried by the support and comprising side walls having the lower edges thereof located close to the ground, said hood having means connected to the support and to the hood for holding the hood in raised or lowered position, end doors connected to the side walls of said hood and operable to open when coming in contact with plants to close by inherent weight thereof to aid in enclosing the plants during the action of the suction means in the hood, agitators in said hood to vibrate and dislodge insects from said plant, said suction means being connected to the hood to create a draft through the hood for removing insects from the plants, one of said doors having side wings movable adjacent the side walls of the hood to substantially prevent entry of air into the hood between the side walls thereof in the last mentioned door.

7. In an insect destroying device comprising a support movable over the ground and plants and means for creating a suction, a hood carried by the support and comprising side walls having the lower edges thereof located close to the ground, end doors connected to said side walls and operable to open when coming in contact with plants and to close by inherent weight thereof to aid in enclosing the plants during the action of the suction means in the hood, said suction means being connected to the hood to create a draft through the hood for removing insects from the plants, one of said doors having side wings movable adjacent the side walls of the hood to substantially prevent entry of air into the hood between the side walls thereof and the last mentioned door.

8. In an insect destroying device comprising a support movable over the ground and over a cotton plant or the like, and means for creating a suction, a hood carried by the support and having downwardly extending side walls and end doors, said doors being mounted on said hood so as to be automatically opened by the pressing of the plant thereagainst, means to normally close the doors, means for preventing in-rush of air between the doors and said side walls when the doors are in open position, said suction means connected to the hood to cause a draft of air upwardly through the hood for removing insects from the plants.

In witness whereof, we hereunto subscribe our names to this specification.

WILLIAM C. BLANKS.
HOWARD F. SNYDER.
JOHN MIKULASEK.